United States Patent
Arkko et al.

(10) Patent No.: US 12,267,672 B2
(45) Date of Patent: Apr. 1, 2025

(54) PROVIDING UE CAPABILITY INFORMATION TO AN AUTHENTICATION SERVER

(71) Applicant: Telefonaktiebolaget LM Ericsson (publ), Stockholm (SE)

(72) Inventors: Jari Arkko, Kauniainen (FI); Vesa Lehtovirta, Espoo (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 373 days.

(21) Appl. No.: 17/437,769

(22) PCT Filed: Mar. 4, 2020

(86) PCT No.: PCT/EP2020/055627
§ 371 (c)(1),
(2) Date: Sep. 9, 2021

(87) PCT Pub. No.: WO2020/182557
PCT Pub. Date: Sep. 17, 2020

(65) Prior Publication Data
US 2022/0159457 A1  May 19, 2022

Related U.S. Application Data

(60) Provisional application No. 62/817,818, filed on Mar. 13, 2019.

(51) Int. Cl.
*H04W 12/06* (2021.01)
*H04L 9/08* (2006.01)
(Continued)

(52) U.S. Cl.
CPC ........... *H04W 12/06* (2013.01); *H04L 9/0841* (2013.01); *H04W 12/03* (2021.01); *H04W 12/0431* (2021.01)

(58) Field of Classification Search
CPC .............................. H04W 12/06; H04L 9/0841
See application file for complete search history.

(56) References Cited

U.S. PATENT DOCUMENTS

2017/0006469 A1* 1/2017 Palanigounder .... H04W 12/068
2017/0318463 A1* 11/2017 Lee ..................... H04L 63/0869
(Continued)

FOREIGN PATENT DOCUMENTS

WO 2016/160256 A1 10/2016
WO WO-2020178046 A1 * 9/2020

OTHER PUBLICATIONS

International Search Report and Written Opinion issued in International Application No. PCT/EP2020/055627 dated Apr. 21, 2020 (11 pages).

(Continued)

*Primary Examiner* — David J Pearson
(74) *Attorney, Agent, or Firm* — Rothwell, Figg, Ernst & Manbeck, P.C.

(57) ABSTRACT

A method (300) for registering with a serving network (104). The method is performed by a UE (102). The method includes the UE transmitting (s302) to the serving network (104) a message (212) indicating a UE capability that is relevant for a home network (106), wherein the 5 serving network (104) is configured to send to the home network (106) a message (216) indicating the UE capability.

25 Claims, 6 Drawing Sheets

(51) Int. Cl.
  *H04W 12/03*     (2021.01)
  *H04W 12/0431*   (2021.01)

(56) References Cited

U.S. PATENT DOCUMENTS

| | | | |
|---|---|---|---|
| 2018/0041507 A1 | 2/2018 | Sivarajan et al. | |
| 2019/0274039 A1* | 9/2019 | Prasad | H04W 12/37 |
| 2021/0409939 A1* | 12/2021 | Baskaran | H04W 12/0431 |
| 2022/0038897 A1* | 2/2022 | Liu | H04W 12/037 |

OTHER PUBLICATIONS

J. Arkko et al., "Perfect-Forward Secrecy for the Extensible Authentication Protocol Method for Authentication and Key Agreement (EAP-AKA' PFS)", Jan. 2019 (25 pages).

Nokia, "UE initiated PFS", 3GPP TSG-SA WG3 Meeting #94Ad-Hoc, S3-190658, Stockholm (Sweden), Mar. 2019 (4 pages).

Nokia et al., "UE initiated EAP-AKA PFS", 3GPP TSG-SA WG3 Meeting #94Ad-Hoc, S3-190659, Stockholm (Sweden), Mar. 2019 (5 pages).

\* cited by examiner

PROVIDING UE CAPABILITY INFORMATION TO AN AUTHENTICATION SERVER

CROSS REFERENCE TO RELATED APPLICATIONS

This application is a 35 U.S.C. § 371 National Stage of International Patent Application No. PCT/EP2020/055627, filed Mar. 4, 2020, which claims priority to U.S. provisional application No. 62/817,818, filed on Mar. 13, 2019. The above identified applications are incorporated by reference.

TECHNICAL FIELD

Disclosed are embodiments related to user equipment (UE) authentication.

BACKGROUND

The 5G security model continues to use Authentication and Key Agreement (AKA) as the default authentication mechanism. AKA is a symmetric-key method and depends on (1) public parameters (such as a random number generated by a home network) exchanged during the authentication protocol procedure and (2) a secret, long-term key stored in the UE (e.g., stored in a SIM card inserted into the UE). In some scenarios, session keys are also generated after or during the authentication procedure. These session keys are also based on the public parameters as well as the long-term key.

AKA can be run either in native form ("5G AKA") or embedded in a generic authentication framework ("EAP-AKA" specified in RFC4187 or "EAP-AKA'" specified in RFC5448 on top of Extensible Authentication Protocol (EAP) per RFC3748).

Previous work (e.g., draft-arkko-eap-aka-pfs (available via HTTP at tools.ietf.org/html/draft-arkko-eap-aka-pfs-04) has called for the introduction of a Diffie-Hellman process to EAP-AKA' authentication which is used in the 5G system. Diffie-Hellman is a traditional way to provide what is called "Perfect Forward Secrecy (PFS)." PFS would allow the long-term key in some cases to be compromised, but the attackers would still not be able to decipher communications protected by the session keys.

Proposals from Nokia (see, e.g., S3-190658, available via HTTP at www.3gpp.org/ftp/TSG_SA/WG3_Security/TSGS3_94AH_Kista/Docs/S3-190658.zip and S3-190659 available via HTTP at www.3gpp.org/ftp/TSG_SA/WG3_Security/TSGS3_94AH_Kista/Docs/S3-190659.zip) describes a mechanism where the UE can initiate the Diffie-Hellman process for EAP-AKA' or indicate support for Diffie-Hellman so that the network can then initiate the Diffie-Hellman for EAP-AKA' if it is willing to do so.

SUMMARY

A perceived downside with the proposal from draft-arkko-eap-aka-pfs is that the home network (e.g., an authentication server in the home network) initiates the procedure. In the end, an optional feature needs to be agreed by both parties to actually be enabled, but when sending the initial message from the home network, the home network does not know if the UE can or wishes to perform the PFS procedure. If the network knew this, it could offer the PFS only to the willing and able UEs, rather than waste bandwidth and computation for sending PFS parameters "just in case" for everyone, particularly when in early deployment the number of capable UEs would be small.

A downside of the proposal in S3-190658 and S3-190659 is that it introduces an additional message round-trip to 5G authentication, just to carry the indication. The proposal does this because the proposal proposes that the UE sends the new information in EAP-Response/Identity message which is a response to an EAP-Request/Identity message from the network. However, these messages would otherwise be optional; they are not used in the 5G system.

In the proposed 5G system, the UE already sends its identity to the network outside of the EAP procedures using a NAS (non-access stratum) signaling message that goes from the UE to the AMF, which includes an SEAF, with the identity information ultimately reaching the 5G authentication server (AUSF). The identity sent in these messages is typically a Subscriber Concealed Identifier (SUCI) or 5G-GUTI if the UE has one.

This disclosure proposes, in one specific embodiment, that when the UE sends to the serving network (e.g., the AMF in the serving network) a NAS message containing the UE's identity (e.g. SUCI), such as a NAS message transmitted by the UE as part of a procedure for the UE to register with the serving network, the UE should also include in the NAS message a PFS indication, which indicates that the UE supports use of PFS. The PFS indication can be carried as part of the security parameters of the message or as a standalone parameter. When the serving network entity (AMF) receives the NAS message with the PFS indication, the serving network sends to the home network (e.g., an AUSF in the home network) an authentication request comprising a PFS indication indicating that the UE supports PFS. The home network (e.g., AUSF) receives the PFS indication, and if it supports a PFS enhanced authentication method (EAP-AKA' PFS) and is willing to use it, initiates EAP-AKA' PFS procedure. An advantage of the above described procedure is that it ensures the UE can indicate support for EAP-AKA' PFS without extra roundtrips, and earlier than in the currently defined process in draft-arkko-eap-aka-pfs. This may reduce the amount of resources needed to compute the cryptographic parameters needed for proposing PFS to every UE that attempts authentication.

More generally, this disclosure proposes a procedure (e.g., a registration procedure) that includes the UE sending to a serving network a message indicating a UE capability that is relevant for the home network, and then the serving network sending to the home network a message indicating the UE capability. This enables the home network to take this UE capability information into account, e.g., by being able to serve a new feature without having to ask the UE first in a separate roundtrip if the UE supports the new feature.

Accordingly, in one aspect there is provided a method performed by a UE for registering with a serving network. The method includes the UE transmitting to the serving network (e.g., an AMF or other entity of the serving network) a message indicating a UE capability that is relevant for a home network (e.g., a message that that indicates that the UE supports a particular feature, such as, for example, a particular authentication feature, such as PFS enhanced authentication), wherein the serving network then sends to an entity (e.g., AUSF) in a home network for the UE a message indicating the UE capability. In some embodiments, sending to the serving network the message indicating the UE capability comprises transmitting to a management function (e.g., AMF) of the serving network a Non-Access Stratum (NAS) message comprising a perfect forward secrecy (PFS) indicator. In some embodiments, the NAS message is a 3GPP Registration Request or Service Request. In some embodiments, the method also includes the UE, after transmitting the message, receiving a challenge transmitted by the home network; and the UE responding to the challenge by transmitting to the home network a response to the challenge.

According to another aspect there is provided a method performed by an authentication server. The method includes the authentication server receiving an authentication request transmitted by an entity of a serving network, the authentication request indicating an authentication capability of a UE, wherein the entity of the serving network transmitted the authentication request in response to receiving a message transmitted by the UE, wherein the message transmitted by the UE indicated the authentication capability of a UE.

In some embodiments, the authentication request comprises a perfect forward secrecy (PFS) indicator that indicates the authentication capability of a UE.

In some embodiments, the authentication request comprises a SUCI and the method further comprises decrypting the SUCI to produce decrypted data, wherein the decrypted data comprises an identifier, ID, for identifying the UE and a perfect forward secrecy (PFS) indicator that indicates the authentication capability of a UE.

In some embodiments, the PFS indicator is a flag. In some embodiments, the PFS indicator comprises a Diffie-Hellman parameter.

In some embodiments the process also includes the authentication server determining whether or not the authentication request indicates the authentication capability; and performing a particular authentication procedure as a result of determining that the authentication request indicates the authentication capability. In some embodiments, performing the particular authentication procedure comprises: generating a first ephemeral key pair consisting of a first private key and a first public key; and transmitting to the UE a request message comprising the first public key. In some embodiments, performing the particular authentication procedure further comprises: receiving a response message transmitted by the UE in response to the request message, wherein the response message comprises a second public key of a second ephemeral key pair generated by the UE.

According to another aspect, a computer program is provided. The computer program includes instructions which when executed by processing circuitry of a UE causes the UE to transmit to a serving network (e.g., an AMF) a message that indicates that the UE supports a particular feature (e.g., a particular authentication feature, such as PFS enhanced authentication).

According to another aspect, a computer program is provided. The computer program includes instructions which when executed by processing circuitry of an authentication sever causes the authentication server to process a received authentication request transmitted by an entity of a serving network, the authentication request indicating an authentication capability of a UE, wherein the entity of the serving network transmitted the authentication request in response to receiving a message transmitted by the UE, wherein the message transmitted by the UE indicated the authentication capability of a UE.

BRIEF DESCRIPTION OF THE DRAWINGS

The accompanying drawings, which are incorporated herein and form part of the specification, illustrate various embodiments.

DETAILED DESCRIPTION

Figure 1:
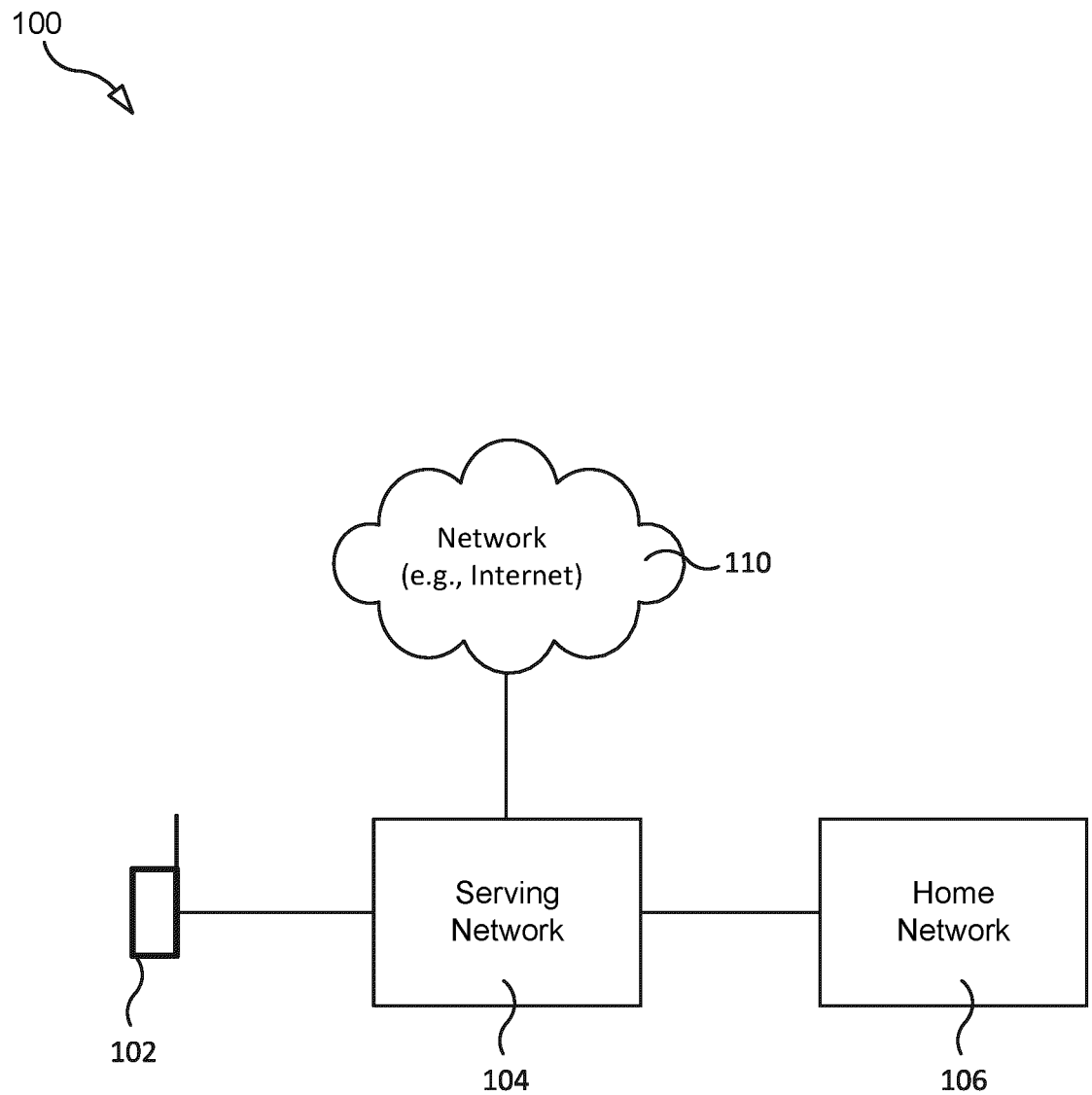
FIG. 1 illustrates a system according to an embodiment.

FIG. 1 illustrates an example communication system 100 that includes a UE 102, a serving network 104, and a home network 106. The UE and home network are both communicatively connected to, and exchange signals with each other via, the serving network. The UE is configured with a subscription identifier identifying a subscription supported by the home network, and accesses the home network using the serving network. The UE may also access a network 110 (e.g., the Internet) via serving network 104.

Typical examples of the UE 102 include a mobile equipment (ME), mobile terminal, smartphone, personal computer, a laptop computer, a desktop computer, a workstation, a tablet computer, a wearable computer, a smart appliance, a sensor, or any other communication device capable of communicating with serving network 104. According to particular embodiments of the UE, the UE may comprise a general memory storage and a tamper resistant secure hardware component providing secure storage, such as a 5G-USIM (Universal Subscriber Identity Module), a UICC (Universal Integrated Circuit Card), e.g. with a 5G-USIM installed thereon, and/or other secure storage device.

The serving network 104 includes entities capable of exchanging communication signals with the UE 102 and/or the home network 106. In particular, the serving network may include, among other entities: an access point 202 (see FIG. 2) (e.g., a base station, eNodeB, femtocell, WLAN access point) and a management function 204 (e.g., a 5G Access and Mobility Management Function (AMF), which may include a Security Anchor Functions (SEAFs).

The home network 106 includes, among other things, an authentication entity 206 (see FIG. 2) (e.g., a 5G Authentication Server Function (AUSF) that may include a SEAF) for authenticating UE 102. Home network 106 may also include: de-concealing servers, key provisioning servers, Subscription Identifier De-concealing Functions (SIDFs), Privacy Key Provisioning Functions (PKPFs), Unified Data Management (UDM) and/or any combination 208 thereof. Entities within home network 106 are components of the UE's home Public Land Mobile Network (PLMN), whereas entities within serving network 106 may be components of the UE's home PLMN or, if UE 102 is roaming, entities of serving network 106 may be components of a visited PLMN (VPLMN).

Figure 2:
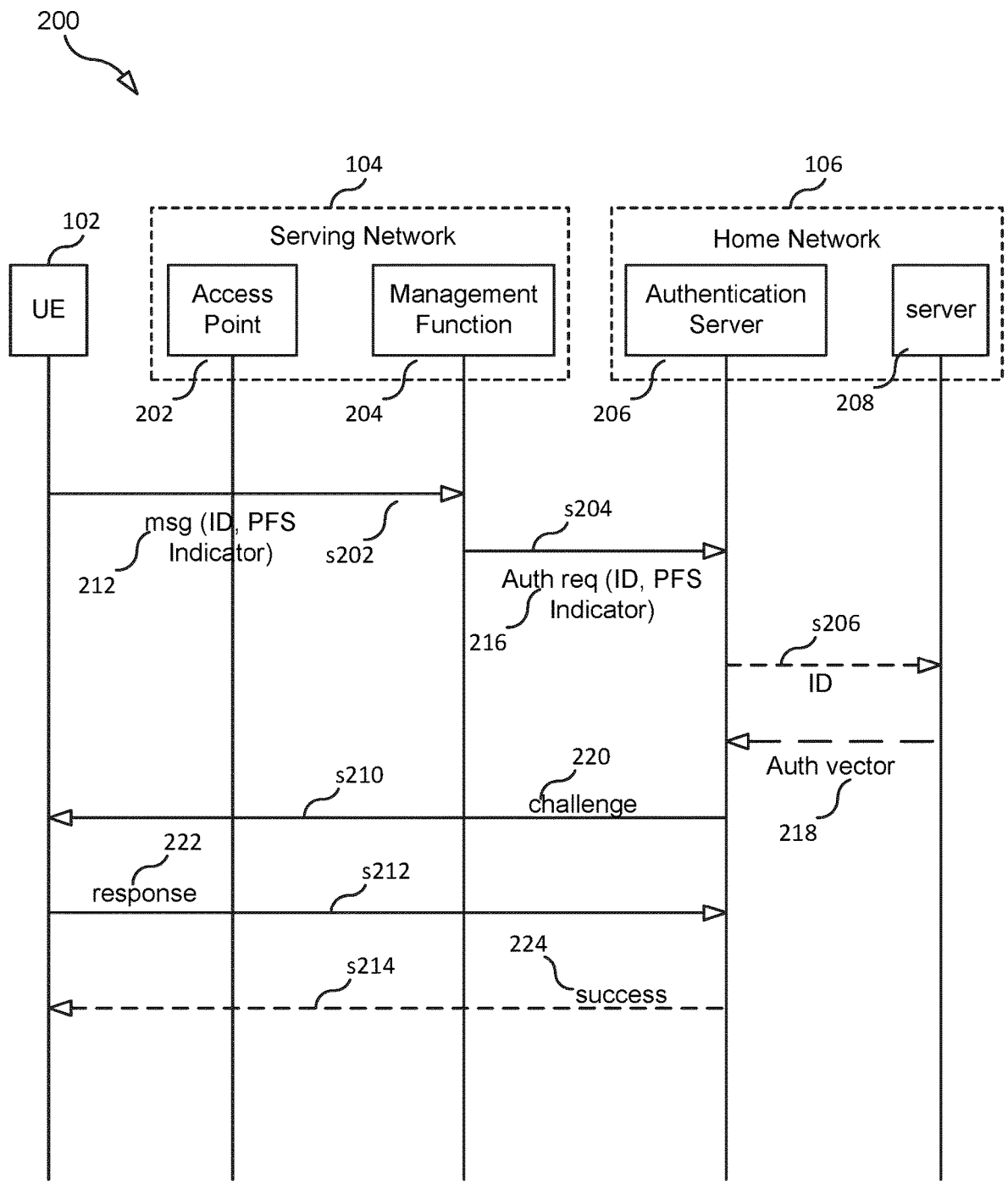
FIG. 2 is a message flow diagram illustrating a message flow according to an embodiment.

FIG. 2 is a message flow diagram illustrating a message flow 200 according to one embodiment. As shown in FIG. 2, the message flow 200 may begin with step s202.

Step s202 comprises UE 102 transmitting to management function 204 of serving network 104 a message 212 (e.g., a Non-Access Stratum (NAS) message) containing a PFS indicator. The PFS indicator may take a variety of forms. For example, in one embodiment, the PFS indicator is a simple indication (e.g. a flag) indicating that the UE supports and is willing to use PFS. In another embodiment, the PFS indicator includes a Diffie-Hellman parameter, such as, for example, a list of curves supported by UE 102 or an ephemeral public key generated by UE 102 using one of the curves supported by UE 102. For example, the PFS indicator in one specific example may include: information indicating the Elliptic Curve selected by UE 102, the ephemeral public key generated using the indicated curve, and other PFS parameters required for Elliptic-curve Diffie-Hellman (ECDHE) to be executed between UE 102 and home network 106.

The message 212 may also contain an identifier (ID) for identifying UE 102. The ID included in message 212 may be a temporary identifier (a 5G Globally Unit Temporary Identifier (GUTI)) or an encrypted permanent identifier (e.g., a SUCI) if a 5G-GUTI has not been allocated by the serving network 104 for the UE.

In some embodiments, message 212 is a Registration Request or a Service Request as specified in 3GPP TS 23.501 and 3GPP TS 23.502. The PFS indicator can be sent in the security parameters information element or in some other information element of message 212. In yet another embodiment, the PFS indicator is included inside (or outside) the encryption within the SUCI. For example, in some embodiments: SUCI=encrypt(Key, ID:PFS Indicator), where encrypt (key, data) means encrypt data using the encryption key Key. Thus, in this embodiment, the SUCI includes both the ID and the PFS indictor.

In step s204, management function 204, after receiving message 212, sends to authentication server 206 (e.g., AUSF/SEAF) an authentication request message 216 (e.g. Nausf_UEAuthentication_Authenticate Request message) that includes the PFS indicator. For example, message 216 may include the SUCI which contains both the ID and PFS indicator.

When authentication server 206 receives message 216, it determines if the PFS indicator is present. For example, when the SUCI contains the indicator, authentication server 206 decrypts the SUCI and determines if the PFS indication is present in the decrypted data. In case it is present, and if the AUSF supports PFS enhanced authentication method and is willing to use it, the AUSF initiates the PFS enhanced authentication procedure with the UE. In some embodiments, The PFS enhanced authentication procedure depends on the type of the received PFS indicator.

In one embodiment, in case the PFS indication is a simple indication like a flag, the PFS enhanced authentication method can be the one specified in draft-arkko-eap-aka-pfs, which includes server 206 performing step s206—i.e., sending a request to server 208 for an authentication vector 218. In another embodiment, if the PFS indication includes a Diffie-Hellman parameter, like the list of curves and/or ephemeral key, the authentication method can be the one described in S3-190658, which omits step s206. In either case, authentication server 206 performs step s210, which comprises authentication server 206 sending to UE 102 a challenge message 220 (e.g., an EAP Request message). The specific content of message 220 will depend on which specific PFS enhanced authentication procedure is used, but in any event message 220 includes an attribute (e.g., AT_PUB_ECDHE) that carries a generated public key. In step s212, UE 102 responds to message 220 by transmitting message 222 (e.g. an EAP Response message as described in draft-arkko-eap-aka-pfs or S3-190658). If UE 102 has not previously sent the ephemeral public key, the ephemeral public key is included in message 222. In some embodiments, authentication server 206 may then respond with a success message 224 (step s214).

Figure 3:
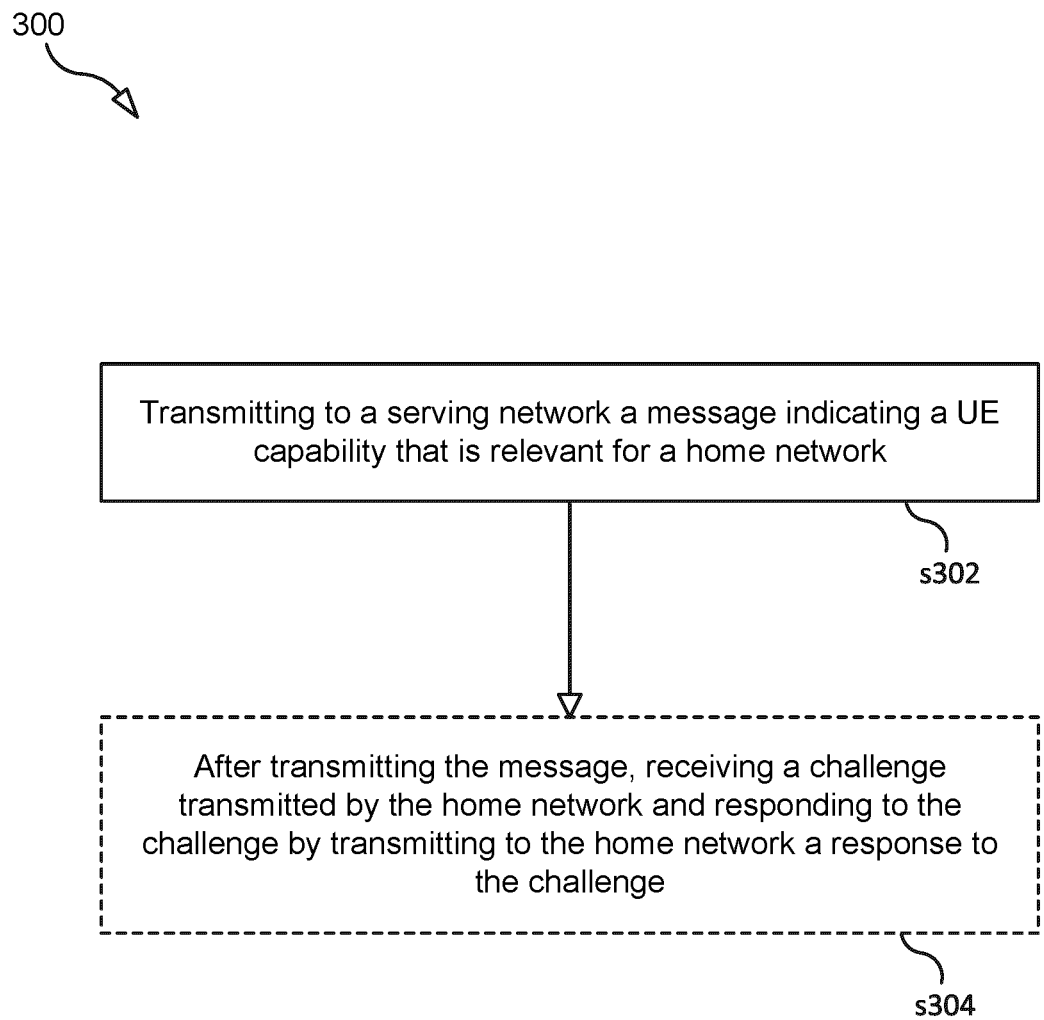
FIG. 3 is a flowchart illustrating a process according to an embodiment.

FIG. 3 is a flowchart illustrating a process 300 for registering with a serving network. Process 300 may begin in step s302. Step s302 comprises UE 102 transmitting to the serving network a message indicating a UE capability that is relevant for a home network. Process 300, in some embodiments, also includes step s304, which comprises UE 102, after transmitting the message, receiving a challenge transmitted by the home network and responding to the challenge by transmitting to the home network a response to the challenge.

In some embodiments, sending to the serving network the message indicating the UE capability comprises transmitting to a management function of the serving network a NAS message comprising a perfect forward secrecy (PFS) indicator.

In some embodiments, the NAS message is a 3GPP Registration Request or Service Request.

Figure 4:
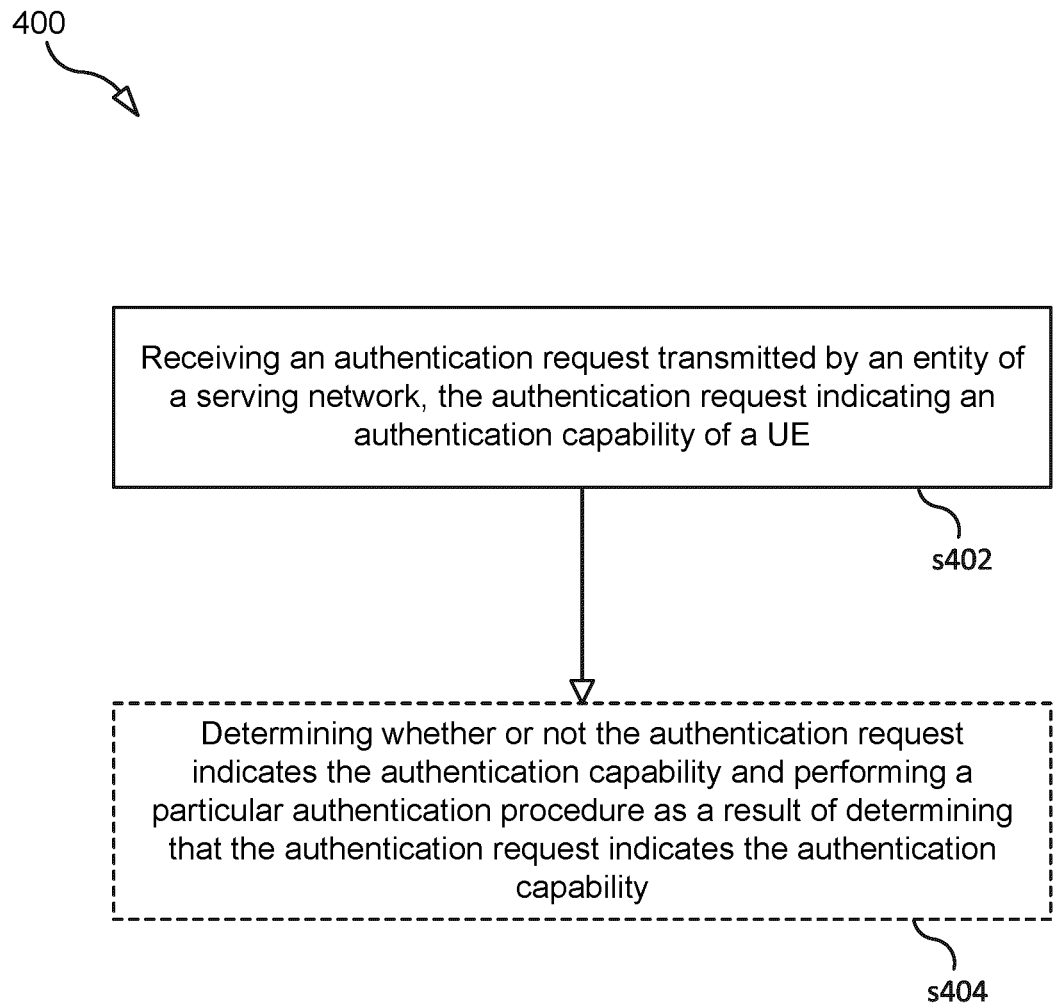
FIG. 4 is a flowchart illustrating a process according to an embodiment.

FIG. 4 is a flow chart illustrating a process 400, according to an embodiment, performed by authentication server 206. Process 400 may begin with step s402.

Step s402 comprises authentication server 206 receiving the authentication request 216 transmitted by an entity of a serving network (e.g., management function 204), the authentication request indicating an authentication capability of UE 102, wherein the entity of the serving network transmitted the authentication request in response to receiving a message 212 transmitted by UE 102, wherein the message transmitted by UE 102 indicated the authentication capability of UE 102.

In some embodiments, process 400 also includes step s404, which comprises authentication server 206 determining whether or not the authentication request indicates the authentication capability and performing a particular authentication procedure as a result of determining that the authentication request indicates the authentication capability.

In some embodiments, performing the particular authentication procedure comprises: authentication server 206 generating a first ephemeral key pair consisting of a first private key and a first public key and transmitting to the UE a request message (a.k.a., challenge message 220) comprising the first public key. In some embodiments, performing the particular authentication procedure further comprises authentication server 206 receiving a response message (e.g. message 222) transmitted by the UE in response to the request message, wherein the response message comprises a second public key of a second ephemeral key pair generated by the UE.

In some embodiments, the authentication request comprises a perfect forward secrecy (PFS) indicator that indicates the authentication capability of a UE.

In some embodiments, the authentication request comprises a SUCI and the method further comprises decrypting the SUCI to produce decrypted data, wherein the decrypted data comprises an identifier, ID, for identifying the UE and a perfect forward secrecy (PFS) indicator that indicates the authentication capability of a UE.

In some embodiments, the PFS indicator is a flag.

In some embodiments, the PFS indicator comprises a Diffie-Hellman parameter.

Figure 5:
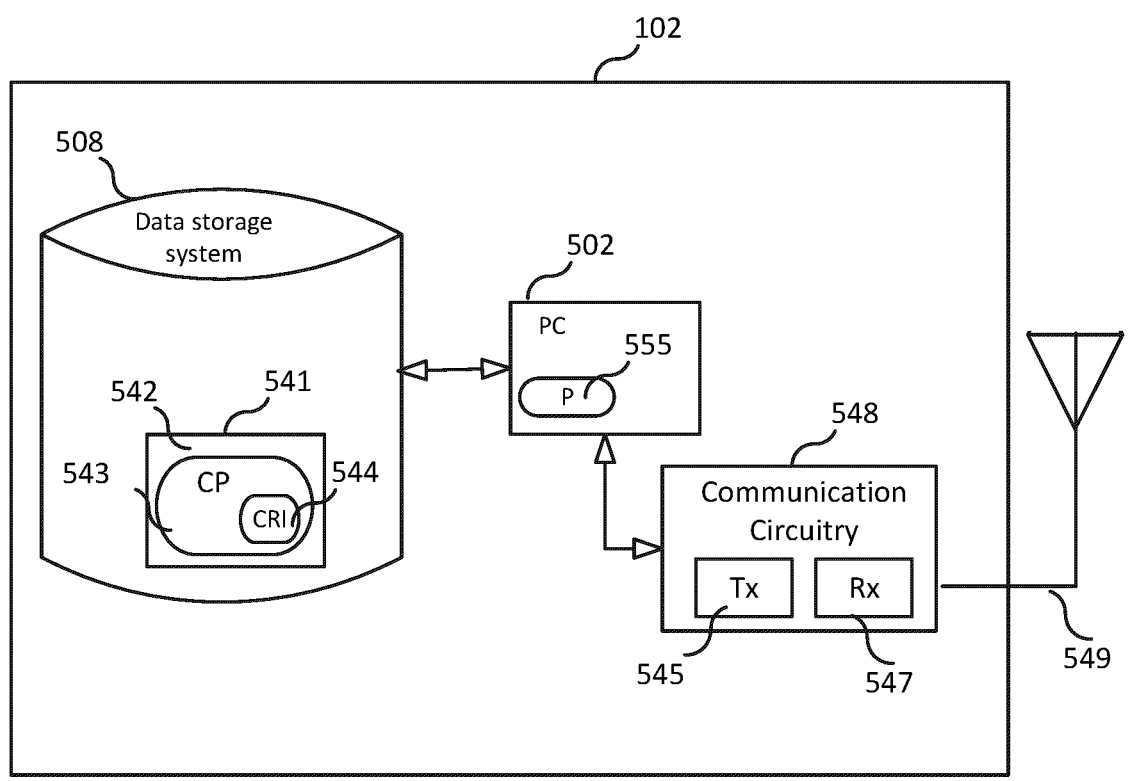
FIG. 5 is a block diagram of a UE according to an embodiment.

FIG. 5 is a block diagram of UE 102, according to some embodiments. As shown in FIG. 5, UE 102 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like); communication circuitry 548, which is coupled to an antenna arrangement 549 comprising one or more antennas and which comprises a transmitter (Tx) 545 and a receiver (Rx) 547 for enabling UE 102 to transmit data and receive data (e.g., wirelessly transmit/receive data); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes UE 102 to perform steps described herein (e.g., steps described herein with reference to the flow charts). In other embodiments, UE 102 may be configured to perform steps described herein without the need for code. That is, for example, PC 502 may consist merely of one or more ASICs. Hence, the features of the embodiments described herein may be implemented in hardware and/or software.

Figure 6:
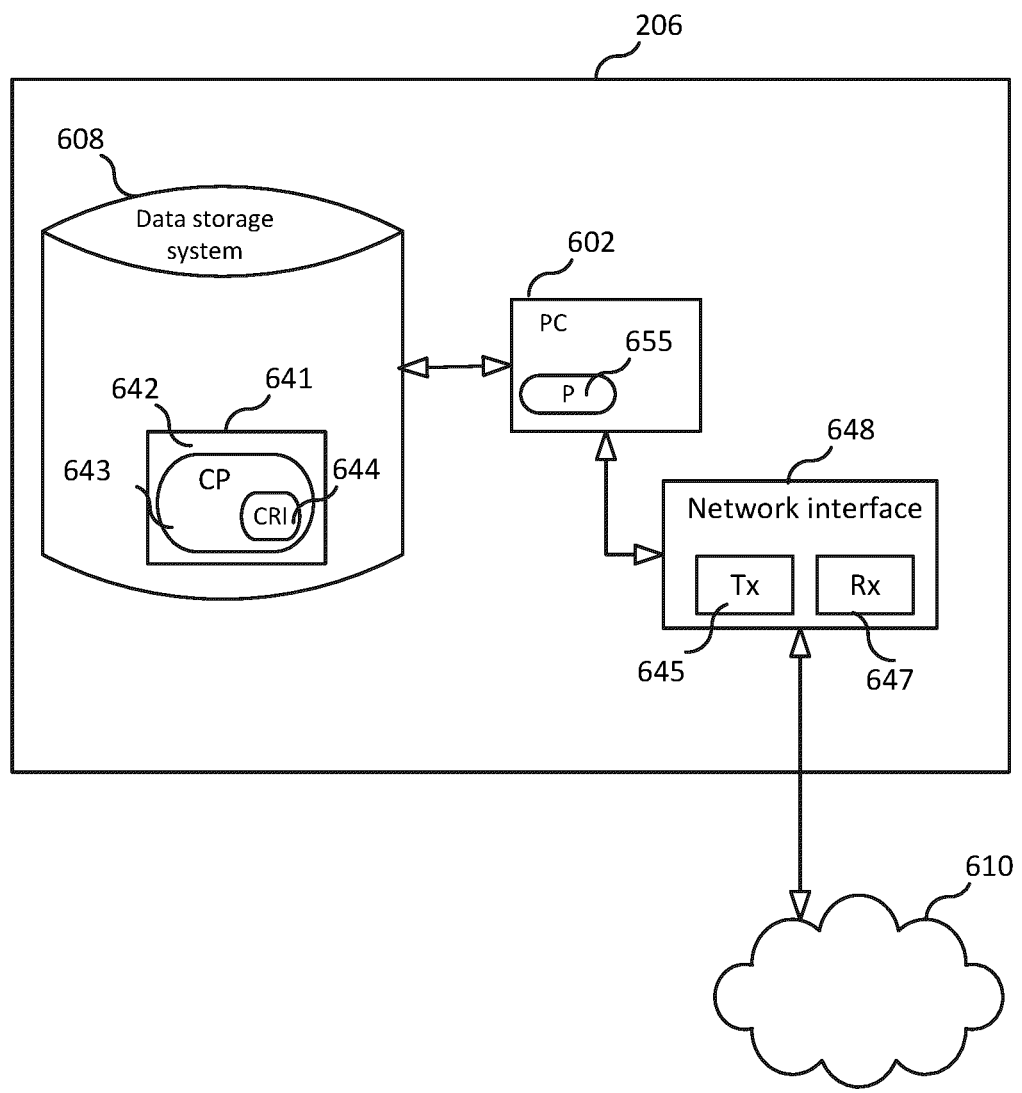
FIG. 6 is a block diagram of an authentication server according to an embodiment.

FIG. 6 is a block diagram of an authentication server 206, according to some embodiments. As shown in FIG. 6, authentication server 206 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 648 comprising a transmitter (Tx) 645 and a receiver (Rx) 647 for enabling authentication server 206 to transmit data to and receive data from other nodes connected to network 610 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes authentication server 206 to perform steps described herein (e.g., steps described herein with reference to the flow charts). In other embodiments, authentication server 206 may be configured to perform steps described herein without the need for code. That is, for example, PC 602 may consist merely of one or more ASICs. Hence, the features of the embodiments described herein may be implemented in hardware and/or software.

Summary of Various Embodiments

A1. A method for registering with a serving network, the method being performed by a user equipment, UE, and comprising: transmitting to the serving network a message indicating a UE capability that is relevant for a home network, wherein the serving network is configured to send to the home network a message indicating the UE capability.

A2. The method of embodiment A1, wherein sending to the serving network the message indicating the UE capability comprises transmitting to a management function (e.g., AMF) of the serving network a Non-Access Stratum (NAS) message comprising a perfect forward secrecy (PFS) indicator.

A3. The method of embodiment A2, wherein the NAS message is a 3GPP Registration Request or Service Request.

A4. The method of embodiment A2, wherein the PFS indicator is a flag.

A5. The method of embodiment A2, wherein the PFS indicator comprises a Diffie-Hellman parameter.

A6. The method of any one of embodiments A1-A5, further comprising: after transmitting the message, receiving a challenge transmitted by the home network; and responding to the challenge by transmitting to the home network a response to the challenge.

B1. A method performed by an authentication server, the method comprising: receiving an authentication request transmitted by an entity of a serving network, the authentication request indicating an authentication capability of a UE, wherein the entity of the serving network transmitted the authentication request in response to receiving a message transmitted by the UE, wherein the message transmitted by the UE indicated the authentication capability of a UE.

B2a. The method of embodiment B1, wherein the authentication request comprises a perfect forward secrecy (PFS) indicator that indicates the authentication capability of a UE.

B2b. The method of embodiment B1, wherein the authentication request comprises a SUCI and the method further comprises decrypting the SUCI to produce decrypted data, wherein the decrypted data comprises an identifier, ID, for identifying the UE and a perfect forward secrecy (PFS) indicator that indicates the authentication capability of a UE.

B3. The method of embodiment B2a or B2b, wherein the PFS indicator is a flag.

B4. The method of embodiment B2a or B2b, wherein the PFS indicator comprises a Diffie-Hellman parameter.

B5. The method of any one of embodiments B1-B4, further comprising: determining whether or not the authentication request indicates the authentication capability; and performing a particular authentication procedure as a result of determining that the authentication request indicates the authentication capability.

B6. The method of embodiment B5, wherein performing the particular authentication procedure comprises: generating a first ephemeral key pair consisting of a first private key and a first public key; and transmitting to the UE a request message comprising the first public key.

B7. The method of embodiment B6, wherein performing the particular authentication procedure further comprises: receiving a response message transmitted by the UE in response to the request message, wherein the response message comprises a second public key of a second ephemeral key pair generated by the UE.

C1. A computer program comprising instructions which when executed by processing circuitry of a node causes the node to perform the method of any one of embodiments A1-A6 or B1-B7.

C2. A carrier containing the computer program of embodiment C1, wherein the carrier is one of an electronic signal, an optical signal, a radio signal, and a computer readable storage medium.

D1. A UE, the UE being configured to transmit to a serving network a message indicating a UE capability that is relevant for a home network, wherein the serving network is configured to send to the home network a message indicating the UE capability.

D2. The UE of embodiment D1, wherein the UE is further configured to perform the method of any one of embodiments A2-A6.

E1. An authentication server, the authentication server being configured to process a received authentication request transmitted by an entity of a serving network, wherein the authentication request indicates an authentication capability of a UE, wherein the entity of the serving network transmitted the authentication request in response to receiving a message transmitted by the UE, wherein the message transmitted by the UE indicated the authentication capability of a UE.

E2. The authentication server of embodiment E1, wherein the authentication server is further configured to perform the method of any one of embodiments B2-B7.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for registering with a serving network, the method being performed by a user equipment (UE) and comprising:
    transmitting to the serving network a message indicating a UE capability that is relevant for a home network, wherein
        the serving network is configured to send to the home network a message indicating the UE capability, and
        the message transmitted by the serving network comprises a Subscriber Concealed Identifier (SUCI) which includes a perfect forward secrecy (PFS) indicator or an encrypted version of the PFS indicator that indicates an authentication capability of the UE; and
    after transmitting the message, receiving a challenge transmitted by the home network, wherein the serving network is separate from the home network.

2. The method of claim 1, wherein transmitting to the serving network the message indicating the UE capability comprises transmitting to a management function of the serving network a Non-Access Stratum (NAS) message comprising the PFS indicator.

3. The method of claim 2, wherein the NAS message is a 3GPP Registration Request or Service Request.

4. The method of claim 2, wherein the PFS indicator is a flag.

5. The method of claim 2, wherein the PFS indicator comprises a Diffie-Hellman parameter.

6. The method of claim 1, further comprising:
    responding to the challenge by transmitting to the home network a response to the challenge.

7. The method of claim 1, wherein the SUCI includes the encrypted version of the PFS indicator.

8. The method of claim 1, wherein the PFS indicator comprises a list of elliptic curves supported by the UE.

9. The method of claim 1, wherein
    the PFS indicator comprises an ephemeral public key generated by the UE, and
    the ephemeral public key was generated using an elliptic curve supported by the UE.

10. The method of claim 1, wherein the PFS indicator comprises an indication of an elliptic curve selected by the UE and an ephemeral public key generated by the UE using the selected elliptic curve.

11. The method of claim 1, wherein SUCI further includes a UE identifier.

12. The method of claim 1, wherein the challenge is an extensible authentication protocol request message.

13. A computer program comprising a non-transitory computer readable medium having instructions stored thereon which, when executed by a stream controller, cause the stream controller to perform the method of claim 1.

14. A method, the method comprising:
    an authentication server in a user equipment's (UE's) home network, receiving an authentication request transmitted by an entity of a serving network serving the UE, the authentication request indicating an authentication capability of the UE, wherein the authentication request comprises a Subscriber Concealed Identifier (SUCI) which includes a perfect forward secrecy (PFS) indicator or an encrypted version of the PFS indicator that indicates the authentication capability of the UE;
    the authentication server determining that the authentication request indicates the authentication capability; and
    the authentication server transmitting a challenge towards the UE as a result of determining that the authentication request indicates the authentication capability, wherein the serving network is separate from the home network.

15. The method of claim 14, wherein
    the method further comprises decrypting the SUCI to produce decrypted data, and
    the decrypted data comprises an identifier for identifying the UE and the PFS indicator that indicates the authentication capability of the UE.

16. The method of claim 14, wherein the PFS indicator is a flag.

17. The method of claim 14, wherein the PFS indicator comprises a Diffie-Hellman parameter.

18. The method of claim 14, further comprising:
    performing a particular authentication procedure as a result of determining that the authentication request indicates the authentication capability.

19. The method of claim 18, wherein performing the particular authentication procedure comprises:
    generating a first ephemeral key pair comprising a first private key and a first public key, wherein the challenge comprises the first public key.

20. The method of claim 19, wherein
    performing the particular authentication procedure further comprises receiving a response message transmitted by the UE in response to the challenge, and
    the response message comprises a second public key of a second ephemeral key pair generated by the UE.

21. The method of claim 14, wherein
    the entity of the serving network transmitted the authentication request in response to receiving a message transmitted by the UE, and
    the message transmitted by the UE indicated the authentication capability of the UE.

22. A user equipment (UE), the UE comprising:
memory; and
processing circuitry coupled to the memory, wherein the UE is configured to:
transmit to a serving network a message indicating a UE capability that is relevant for a home network, wherein the serving network is configured to send to the home network a message indicating the UE capability and the message transmitted by the serving network comprises a Subscriber Concealed Identifier (SUCI) which includes a perfect forward secrecy (PFS) indicator or an encrypted version of the PFS indicator that indicates an authentication capability of the UE; and
after transmitting the message, receive a challenge transmitted by the home network, wherein the serving network is separate from the home network.

23. The UE of claim 22, wherein the message transmitted by the UE is a Non-Access Stratum (NAS) message comprising a perfect forward secrecy (PFS) indicator.

24. An authentication server in a user equipment's (UE's) home network, the authentication server comprising:
memory; and
processing circuitry coupled to the memory, wherein the authentication server is configured to:
process a received authentication request transmitted by an entity of a serving network serving the UE, wherein the authentication request indicates an authentication capability of the UE, wherein the authentication request comprises a Subscriber Concealed Identifier (SUCI) which includes a perfect forward secrecy (PFS) indicator or an encrypted version of the PFS indicator that indicates the authentication capability of the UE;
determine that the authentication request indicates the authentication capability; and
transmit a challenge towards the UE as a result of determining that the authentication request indicates the authentication capability, wherein the serving network is separate from the home network.

25. The authentication server of claim 24, wherein
the entity of the serving network transmitted the authentication request in response to receiving a message transmitted by the UE, and
the message transmitted by the UE is a Non-Access Stratum (NAS) message comprising a perfect forward secrecy (PFS) indicator.

* * * * *